United States Patent
Larrasoaña Alconero

(10) Patent No.: US 9,243,615 B2
(45) Date of Patent: Jan. 26, 2016

(54) SYSTEMS AND PROCEDURES FOR WIND TURBINE SELF-DIAGNOSIS

(75) Inventor: Mikel Larrasoaña Alconero, Zamudio (ES)

(73) Assignee: GAMESA INNOVATION & TECHNOLOGY, S. L., Sarriguren (ES)

( * ) Notice: Subject to any disclaimer, the term of this patent is extended or adjusted under 35 U.S.C. 154(b) by 1107 days.

(21) Appl. No.: 13/320,571

(22) PCT Filed: May 21, 2009

(86) PCT No.: PCT/ES2009/070174
§ 371 (c)(1),
(2), (4) Date: Nov. 15, 2011

(87) PCT Pub. No.: WO2010/133720
PCT Pub. Date: Nov. 25, 2010

(65) Prior Publication Data
US 2012/0065918 A1    Mar. 15, 2012

(51) Int. Cl.
*G06F 17/40* (2006.01)
*G06F 19/00* (2011.01)
(Continued)

(52) U.S. Cl.
CPC ............ *F03D 11/0091* (2013.01); *F03D 1/003* (2013.01); *F05B 2260/80* (2013.01); *F05B 2260/83* (2013.01); *G06F 17/40* (2013.01); *G06F 19/00* (2013.01); *Y02E 10/722* (2013.01)

(58) Field of Classification Search
CPC ............ F03D 1/00; F03D 1/003; F03D 7/00; F03D 7/02; F03D 7/04; F03D 11/00; F03D 11/0091; F05B 2260/00; F05B 2260/80; F05B 2260/83; G01D 7/00; G01D 9/00; G01D 21/00; G06F 11/00; G06F 11/30; G06F 11/3065; G06F 11/32; G06F 11/321; G06F 11/324; G06F 11/34; G06F 11/3466; G06F 15/00; G06F 15/16; G06F 17/00; G06F 17/10; G06F 17/40; G06F 19/00; Y02E 10/00; Y02E 10/70; Y02E 11/72; Y02E 10/722; Y02E 10/723
USPC .......... 73/66, 147, 432.1, 455, 457, 570, 572, 73/865.8, 865.9; 340/500, 540, 679; 416/61; 702/1, 33, 34, 108, 113, 117, 702/119, 127, 182, 183, 184, 185, 187, 702/189; 708/100, 105, 200
See application file for complete search history.

(56) References Cited

U.S. PATENT DOCUMENTS 2,883,255 A * 4/1959 Anderson .................... 346/34
3,321,613 A * 5/1967 Searle ....................... 702/182
(Continued)

FOREIGN PATENT DOCUMENTS

WO     2008/074324 A2     6/2008

OTHER PUBLICATIONS

International Search Report dated Dec. 2, 2010 for Application No. PCT/ES2009/070174.
(Continued)

*Primary Examiner* — Edward Cosimano
(74) *Attorney, Agent, or Firm* — Ladas & Parry LLP

(57) ABSTRACT

Systems and procedures for wind turbine self-diagnosis which includes: a) A module for the identification (41) of potentially defective components based on the signs provided by the active alarms (31) of the wind turbine's control system, including a module for the filtration of alarms (43); b) A test module (61) with a plurality of tests for verifying the availability of the wind turbine's functional units; c) A self-diagnosis module (51) which manages the selection and sequential execution of the tests (61) applicable to the potentially defective components using a weighted algorithm for the tests (61); d) A communications module (53) which manages the storage and transmission of the results (55) of the self-diagnosis to a control center (73).

9 Claims, 1 Drawing Sheet

(51) Int. Cl.
 *F03D 11/00* (2006.01)
 *F03D 1/00* (2006.01)

(56) References Cited

U.S. PATENT DOCUMENTS

| | | | | |
|---|---|---|---|---|
| 3,362,217 | A | * | 1/1968 | Anthony et al. ............ 73/112.01 |
| 4,985,857 | A | * | 1/1991 | Bajpai et al. ................... 702/184 |
| 5,195,095 | A | * | 3/1993 | Shah ................................ 714/26 |
| 8,112,239 | B2 | * | 2/2012 | Elisiussen ...................... 702/113 |
| 2002/0029097 | A1 | | 3/2002 | Pionzio, Jr. et al. |
| 2009/0259429 | A1 | * | 10/2009 | Elisiussen ...................... 702/113 |

OTHER PUBLICATIONS

Chao, C. S., et al., "An Automated Fault Diagnosis System Using Hierarchical Reasoning and Alarm Correlation", Internet Applications, IEEE Aug. 1999, pp. 120-127.

Ungar, Louis, Y., "Hierarchical Built-In Test: An Alternative Test and Repair Strategy", AUTOTESTCON, Aug. 8-10, 1995, pp. 456-463.

Caselitz, P., et al., On-Line Fault Detection and Prediction in Wind Energy Converters, Proceedings of the EWEC '94, pp. 623-627.

Jakobson, G., et al., Alarm Correlation, IEEE Network, Nov. 1993, pp. 52-59.

Campbell, P.R.J., et al., "Paradigms for Alarm Correlation in the Wind Energy Domain", Proceedings of the Fourth IASTED International Conference, Aug. 17-19, 2004, pp. 322-326.

* cited by examiner

SYSTEMS AND PROCEDURES FOR WIND TURBINE SELF-DIAGNOSIS

FIELD OF THE INVENTION

This invention refers to systems and procedures for carrying out tests on the verification and availability of a wind turbine's components, and in particular, systems and procedures for wind turbine self-diagnosis.

BACKGROUND OF THE INVENTION

Modern wind turbines are equipped with a multitude of varied sensors and systems for collecting data, used for different purposes.

Therefore, for example, in the US20020029097 patent application, a wind farm control system is described based upon the information provided by the control systems of the commands and data collection of each of the park's wind turbines, known as SCADA systems, as well as other sources of information such as, in particular, a meteorological station.

The optimization of wind farm management is a task which implies diverse aspects including, amongst others, wind turbine maintenance, requiring efficient procedures for detecting defects and for repairing faulty components. Now then, given the structural complexity of wind turbines as well as the problems posed by their physical location, this is no simple task.

In order to improve wind turbine maintenance tasks, the WO 2008/074324 patent application proposes methods and systems for performing functional tests on a wind turbine. In essence, the method consists of executing the routine for the activation of a determined computer component, obtaining measurement data related with its functioning, and comparing this information with reference data in order to determine the status of the component. The method is executed through another control system proper to the method which substitutes the wind turbine's operative control system.

There is, however, no known proposal aimed at wind turbine self-diagnosis, despite the fact that it would, obviously, contribute toward the optimization of its maintenance.

This invention is aimed at satisfying this need.

SUMMARY OF THE INVENTION

One of the objectives of this invention is to provide systems and procedures which allow for carrying out on a wind turbine, in the event of any failure, a self-diagnosis to identify which component(s) failed.

Another objective of this invention is to provide procedures and systems which allow for optimizing wind turbine maintenance by identifying defective components, thereby facilitating their replacement on-site.

Initially, these and other objectives are fulfilled by means of a wind turbine self-diagnosis procedure encompassing a plurality of tests for verifying the availability of the wind turbine's functional units as well as a plurality of alarms for monitoring the components of these functional units, comprised of the following phases:

Identification of the wind turbine's potentially defective components on the basis of active alarms.

Selection of applicable tests for these components and their sequential execution in a predetermined order based on a weighted value attributed to the tests, depending on specific parameters.

Identification of the wind turbine's potentially defective components on the basis of the test results.

Second, these and other objectives are fulfilled by means of a wind turbine self-diagnosis system which includes:

A module for the identification of the potentially defective components on the basis of signs given by active alarms of the wind turbine's control system.

A test module including a plurality of tests for verifying the availability of the wind turbine's functional units.

A self-diagnosis module which manages the selection and sequential execution of the tests applicable to the potentially defective components.

A communications module which manages the storage and transmission of the results of the self-diagnosis to a control center.

According to the preferential execution of the invention, a hierarchical alarm structure is used to allow for disregarding those active alarms which are hierarchically dependent on other active alarms. Through this, the self-diagnosis is optimized by taking into account only relevant alarms in detecting faulty components.

In another preferential execution of the invention, the diagnostic tests are divided into subtests, specifically electrical, actuator and functional subtests. Through this, the self-diagnosis is optimized by reducing the number of applicable tests since for certain wind turbine components, it is unnecessary to carry out the complete test, but rather, it suffices to perform an electrical or actuator subtest.

According to another preferential execution of the invention, the order for executing the tests is determined on the basis of a weighted value attributed to the tests, depending on specific parameters, such as test duration and failure rates of the components covered by the test. Through this, the self-diagnosis is optimized by avoiding duplicate test applications for a same component and by minimizing the duration of the self-diagnosis.

Other characteristics and advantages of this invention will be deduced from the detailed description which follows the illustrations of their object, in relation with the accompanying figures.

DETAILED DESCRIPTION OF THE INVENTION

Figure 1:
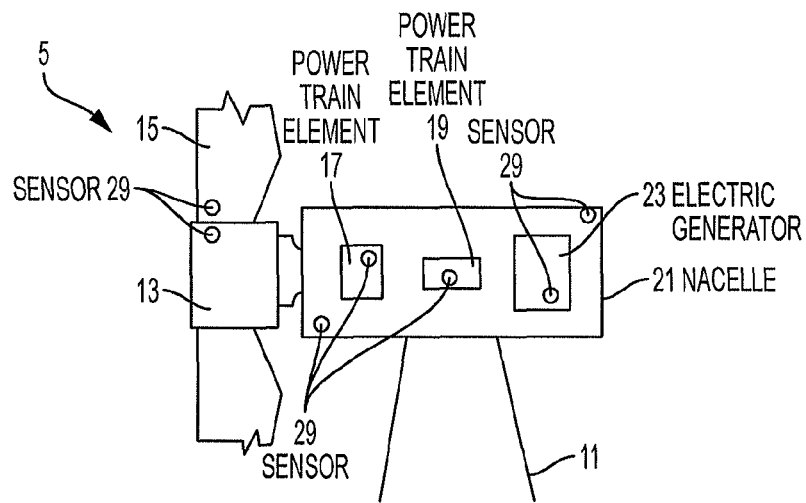
FIG. 1 shows a schematic view of typical components of a wind turbine.

Wind turbines are devices that transform mechanical energy into electrical energy. As is shown in FIG. 1, a typical wind turbine 5 includes a nacelle 21 assembled above a tower 11 which houses a power train that includes elements 17, 19 for transmitting rotor rotation 13, at which one or more blades 15, are connected to an electric generator 23. It also includes a plurality of sensors 29 for monitoring the wind turbine's components.

In general, wind turbine control is done at two levels. At a first level, a first control module inputs references which are external to the wind turbine, such as wind speed, grid voltage, grid frequency, etc., and corrects blade angles, nacelle orientation, etc. to adapt the wind turbine's operation and supply the power required under actual working conditions. On another hand, at a second level, a second control module controls the wind turbine's connection to the utility grid, both in relation with connection and disconnection as well as power generation and the quality of power supplied to the grid.

According to the preferential execution of the invention, the wind turbine's control system is equipped, furthermore, with a plurality of tests for verifying the availability of the wind turbine's functional units, each of which are divided into subtests for the purpose of carrying out different operations.

According to the preferential execution of the invention, a test is divided into electrical and actuator tests plus one or more functional subtests, as well as additional modules for test management, in particular, a reset module for resetting the wind turbine given the operations carried out during the functional subtests, and a module for the presentation of test results.

One example of such available tests which may be mentioned is a test for verifying the availability of the Gearbox Refrigeration System, a functional unit comprised of several components (fans, pumps, motors, resistors, etc.). Within the scope of this test, the electric subtest checks the electric signals of the functional unit, the actuator subtest checks that the electric power consumed by each of the functional unit's actuators falls within a predetermined range, a first functional subtest checks the elements of the gearbox's water-glycol refrigeration circuit, and a second functional subtest checks the elements of the gearbox oil refrigeration circuit.

The execution of a test involves three parts:

Main routine through which subroutines are managed, parameters are initialized and general safety conditions are set.

Subtests through which the components are diagnosed.

Interpretation of the results, where the data generated by the subtests is collected and evaluated. The ultimate purpose of the test is to inform on the correct or incorrect functioning of the components considered within each functional unit, with three possible results: "OK", when functioning is correct; "No OK", when functioning is incorrect; "Gap", when the test has finalized and, for any reason, has failed to evaluate the component in question.

A complete test, though composed of several routines, may be basically divided into the part which checks the electrical-actuator components and the functional part which checks the rest. It is considered convenient to be able to execute only the electrical subtest, the actuator subtest, or the test in its entirety.

Each of the available tests displays its execution time, whether executed in full or in part (checking, for example, only electrical-actuator components).

Before describing the preferential execution of the self-diagnosis according to this invention which follows below, some of the terms used in this descriptive report will be defined for the purpose of correctly understanding this invention.

Component: Unitary group of elements of the wind turbine which must be replaced as a whole in the event of failure, also known as the LRU ("Line Replaceable Unit"). Merely for informational purposes, it may be said that a modern wind turbine is made up of around 1200 components.

Functional unit: Set of wind turbine components object of a test. Merely for informational purposes, it may be said that tests number around 20. Functional units have a variable number of components which, merely for informational purposes and on the average, may number around 100. Two different functional units may have elements in common.

Figure 2:
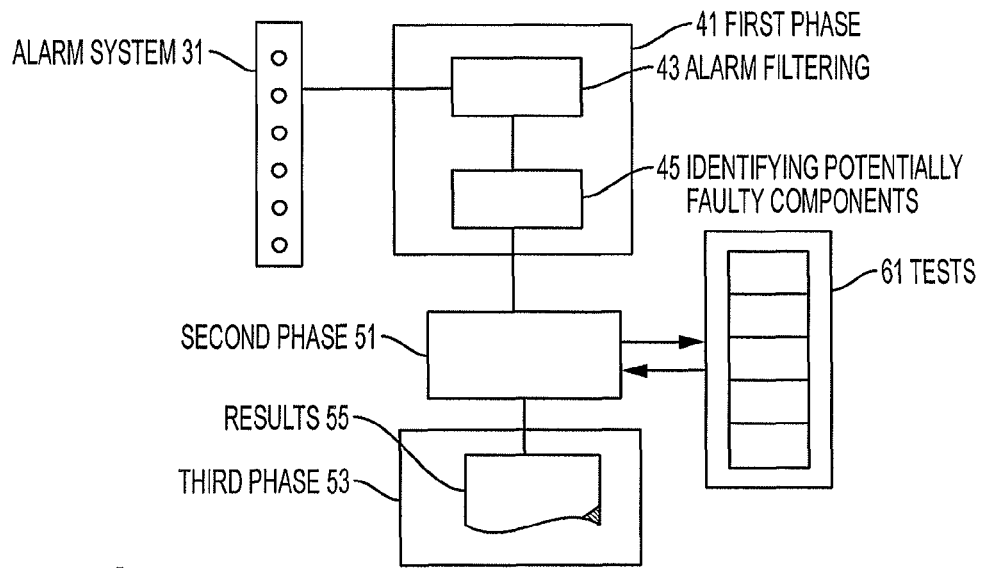
FIG. 2 is a block diagram which illustrates the procedure field of the invention.

The self-diagnosis procedure according to the preferential execution of this invention, illustrated in FIG. 2, is made up of the three basic phases. a first phase 41 for identifying partially defective components, a second phase 51 for selecting and executing tests described in detail below, and a third phase 53 for identifying faulty wind turbine components, based on the results of these tests 61.

a) Stage 41: Identification of Potentially Faulty Components

Once the self-diagnosis procedure is activated, a task normally linked with the stop of the wind turbine, potentially faulty components are identified through the two steps described next.

a1) Step 43: Alarm Filtering

The wind turbine control system has an alarm system 31 which uses data collected by the sensors 29, taken into account for performing different wind turbine operations and which, when necessary, automatically detains the wind turbine and activates the self-diagnosis procedure.

Active alarms at the time of starting the self-diagnosis are indicative signs of potentially defective components but are not signs indicative of defective components. For example, electrical failure in the distribution cabinet, monitored by an alarm a, is also interpreted as faults in all elements whose power supply depends on this cabinet, monitored by alarms b, c, and d. Therefore, if alarm a is active, alarms b, c, and d will also be active. Now then, in these cases, it is convenient to disregard alarms b, c, and d since these would unnecessarily increase the number of tests to be performed.

To this effect, a table is available, as follows, which shows inter-alarm dependencies in which for all of the wind turbine's alarms (left column) each alarm dependent on these are shown in the columns to the right:

| Alarm # | Dependent Alarm #s | | | |
|---|---|---|---|---|
| 1 | 3 | 9 | ... | 120 |
| ... | | | ... | |
| 120 | — | — | ... | — |
| ... | ... | ... | ... | ... |

In this step, active alarms are filtered using this table for identifying as relevant alarms those active alarms which do not depend on another active alarm. Therefore, if alarms 1 and 120 are active, alarm 120 would be disregarded since it is dependent on alarm 1.

a2) Step 45: Potentially Faulty Components

Potentially faulty components, which will also be referred to as the Initial Ambiguity Group (GAI—Grupo de Ambigüedad Inicial), are determined by the relevant alarms identified in the preceding step by means of a table, like the one which follows, which relates alarms and components.

| Alarm # | Component # | | | |
|---|---|---|---|---|
| 1 | 17 | 23 | ... | 555 |
| 2 | 4 | 33 | ... | — |
| ... | ... | ... | ... | ... |
| N | 12 | 33 | ... | 500 |

Therefore, the Initial Ambiguity Group would be made up of components 4, 12, 17, 23, 33, 500, and 555.

b) Stage (Second Phase) 51: Selection and Execution of Test

In this stage are identified, first, from amongst available tests (block 61), those which cover the components of the Initial Ambiguity Group. To do this, a table is used, like the one which follows, which relates these components with tests applicable to them.

| Component # | Failure Rate | Test Type | Test 1 | Test 2 | ... | Test 20 |
|---|---|---|---|---|---|---|
| 1 | 56 | Elec.-Act. | 0 | 1 | ... | |
| ... | ... | ... | ... | ... | ... | ... |
| n | 102 | Complete | 1 | 1 | ... | 0 |

As an example, Component #1, with a failure rate of 56 (using as the unit of measure the number of failures per million hours) of the 20 tests available, only Test 2 applies, and partially: only the electrical and actuator subtests. On another hand, for Component #n, with a failure rate of 102, Tests 1 and 2 apply in full.

Based on the preceding table, in step 53, each test is assigned a weighted value $V_p T_j$ directly proportionate to the number of components to which it applies and its failure rate, and inversely proportionate to the execution time, and the test to be performed is the one which results with the higher weighted value $V_p T_j$.

Eliminating from the preceding table the components checked by the first test completed, the weighted value is recalculated for the remaining components and the test to be performed next is that which results in the highest weighted value $V_p T_j$.

This process is repeated until all the components have been checked.

c) Stage 53: Identification of Faulty Components

In the last phase 53 partially defective components, based on the results 55 of these tests, are identified in the form of a list of components, indicating their status (OK or no OK), or whether it has not been, for any reason, tested.

As the expert in the matter will appreciate, according to the invention the different modules of the self-diagnosis system include means for executing the different phases of the procedure. In particular, the alarm filtration module 43 includes an algorithm based on a hierarchical alarm structure 31 for disregarding those active alarms which are hierarchically dependent on other active alarms, and the self-diagnosis module (second phase) 51 includes an algorithm which determines the order for performing tests 61, depending on the weighted value attributed to each one according to predetermined parameters.

Figure 3:
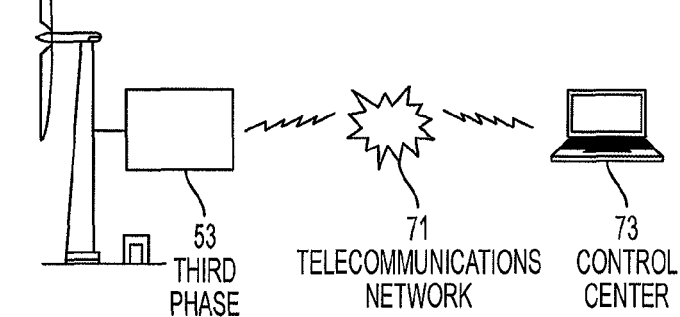
FIG. 3 is a schematic view of the operating procedures for the system field of the invention.

The basic characteristics of the self-diagnosis system according to this invention are linked, as is shown in FIG. 3, to the automatic execution within the wind turbine's control system 5 and in the automatic storage and transmission of the results 55 of the diagnosis to an independent control center 73 through a telecommunications network 71, so that in this control center 73 precise information on faulty components will be immediately available in order to organize operations for their replacement and/or repair.

According to the preferential executions just described, modifications included within the scope defined by the following claims may be introduced.

What is claimed is:

1. A wind turbine self-diagnosis procedure, comprising the steps of:
    a) identifying potentially defective components of a wind turbine on the basis of signs given by active alarms by using a table which relates the active alarms to the potentially defective components;
    b) selecting applicable diagnostic tests for said potentially defective components by using a table which relates the potentially defective components with diagnostic tests applicable to them;
    c) assigning to each applicable diagnostic test a weighted value directly proportionate to the number of potentially defective components to which the test applies and to the failure rate of potentially defective components covered by the test, and inversely proportionate to the duration of the test;
    d) performing a diagnostic test having the highest weighted value from step c);
    e) eliminating from the table of step b) the components checked by the diagnostic test completed in step d), recalculating the weighted values for the remaining components, and performing a diagnostic test having the highest weighted value;
    f) repeating step e) until all components have been checked; and
    g identifying potentially defective components of the wind turbine on the basis of results of the diagnostic tests performed in steps d)-f).

2. The wind turbine self-diagnosis procedure according to claim 1, wherein the diagnostic tests include several subtests.

3. The wind turbine self-diagnosis procedure according to claim 2, wherein the subtests include at least one of the following:
    an electrical subtest;
    an actuator subtest; and
    a functional subtest.

4. The wind turbine self-diagnosis procedure according to claim 1, further comprising performing step a) using a hierarchical alarm structure to allow for disregarding the active alarms which are hierarchically dependent on other active alarms.

5. The wind turbine self-diagnosis procedure according to claim 4, wherein the diagnostic tests include several subtests.

6. The wind turbine self-diagnosis procedure according to claim 5, wherein the subtests include at least one of the following:
    an electrical subtest;
    an actuator subtest; and
    a functional subtest.

7. A wind turbine fault self-diagnosis system comprising:
    a) an identifying module configured to identify potentially defective components on the basis of signs given by active alarms of a control system of the wind turbine by using a table that relates the active alarms to the potentially defective components;
    b) a test module configured to select applicable diagnostic tests for said potentially defective components by using a table that relates the potentially defective components with diagnostic tests applicable to them;
    c) a self-diagnosis module configured to select and sequentially execute the diagnostic tests applicable to the potentially defective components,
    wherein the self-diagnosis module is configured to assign to each applicable diagnostic test a weighted value proportional to the number of potentially defective components to which the test applies and to the failure rate of potentially defective components covered by the test, and inversely proportional to the duration of the test; and d) a communications module configured to manage the storage and transmission of results from the self-diagnosis module to a control center.

8. The wind turbine fault self-diagnosis system according to claim 7, wherein the module for identifying potentially defective components includes an alarm filtration module which has an algorithm which uses a hierarchical alarm structure to allow for disregarding the active alarms which are hierarchically dependent on other active alarms.

9. The wind turbine fault self-diagnosis system according to claim 7, wherein each of the tests in the test module includes at least one of the following subtests:
   an electrical subtest;
   an actuator subtest; and
   a functional subtest.

* * * * *